(12) United States Patent
Iwasawa (10) Patent No.: US 9,256,058 B2
(45) Date of Patent: Feb. 9, 2016

(54) ZOOM LENS AND IMAGING APPARATUS

(71) Applicant: Tamron Co., Ltd., Saitama-shi (JP)

(72) Inventor: Yoshito Iwasawa, Saitama (JP)

(73) Assignee: TAMRON CO., LTD., Saitama-Shi (JP)

( * ) Notice: Subject to any disclaimer, the term of this patent is extended or adjusted under 35 U.S.C. 154(b) by 0 days.

(21) Appl. No.: 14/284,630

(22) Filed: May 22, 2014

(65) Prior Publication Data

US 2014/0347524 A1 Nov. 27, 2014

(30) Foreign Application Priority Data

May 23, 2013 (JP) ................................. 2013-108754

(51) Int. Cl.
*G02B 15/14* (2006.01)
*G02B 15/17* (2006.01)
*G02B 7/10* (2006.01)

(52) U.S. Cl.
CPC . *G02B 15/17* (2013.01); *G02B 7/10* (2013.01)

(58) Field of Classification Search
CPC .............. G02B 15/173; G02B 13/009; G02B 13/0045; G02B 15/20; G02B 13/04; G02B 13/12; G02B 15/22
USPC ......................................... 359/676, 695, 684
See application file for complete search history.

(56) References Cited

U.S. PATENT DOCUMENTS

2009/0251781 A1  10/2009  Adachi et al.

FOREIGN PATENT DOCUMENTS

JP         2009265652 A      11/2009

*Primary Examiner* — Alicia M Harrington
(74) *Attorney, Agent, or Firm* — The Webb Law Firm (57) ABSTRACT

The zoom lens is composed of: an object side lens group at least including, in order from an object side: a first lens group G1 having positive refractive power; and a second lens group G2 having negative refractive power; and an image focusing side lens group including, in order from the object side: a negative lens group A having negative refractive power; and a negative lens group B arranged by facing the negative lens group A across an air distance, having negative refractive power. In the zoom lens, focusing from infinity to a close object is achieved by moving just the negative lens group A toward an image focusing side to satisfy a conditional expression below:

[Expression 1]

$$-1.80 < \beta 2t < -0.94 \quad (1)$$

$$(1-\beta At^2) \times \beta Bt^2 < -4.5 \quad (2)$$

where "β2t" is lateral magnification at a telephoto end of the second lens group in infinity focusing, "βAt" is lateral magnification at a telephoto end of the negative lens group A in infinity focusing, and "βBt" is lateral magnification at a telephoto end of the negative lens group B in infinity focusing.

7 Claims, 6 Drawing Sheets

ZOOM LENS AND IMAGING APPARATUS

CROSS-REFERENCE TO RELATED APPLICATION

This application claims priority to Japanese Patent Application No. 2013-108754 filed May 23, 2013, the disclosure of which is hereby incorporated in its entirety by reference.

BACKGROUND OF THE INVENTION

1. Field of the Invention

The present invention relates to a zoom lens and an imaging apparatus including the zoom lens, and more particularly to a small-sized zoom lens having a high magnification change ratio, and an imaging apparatus including the zoom lens.

2. Description of the Related Art

Imaging apparatuses including a digital still camera using solid state imaging sensors have become widespread. In recent years, small-sized imaging apparatus systems using small-sized solid state imaging sensors including Micro Four Thirds have been rapidly developing. Accordingly, requirement on a miniature zoom lens having high imaging performance have increased depending on market needs for a zoom lens adjusting a focal length depending on an object as an optical systems in the imaging systems. Moreover, in recent years, market needs for a telephoto zoom lens with a high magnification change ratio like a focal length exceeding 300 mm in terms of 35-mm film have been increased.

In an interchangeable lens for a small-sized imaging system of such type, focusing by a contrast method instead of a conventional phase difference method has been employed. In the phase difference method, a focus position is determined on the basis of distance information estimated by a phase difference sensor. In contrast, a peak position of contrast of a subject image determined on an imaging sensor surface is detected while a focus lens group is moved along an optical axis to detect the peak position as a focus position in the contrast method. As described above, in the contrast method, moving of a focus lens group in order to detect a peak position of contrast is necessary. As a result, a focus speed tends to reduce as compared with the phase difference method. Accordingly, to achieve high speed autofocusing in the contrast method, high speed movement of a focus lens group is necessary.

A zoom lens disclosed in Japanese Patent Laid-Open No. 2009-265652 achieves high imaging performance all over a zooming area by increasing the number of movable lens groups in zooming to increase degrees of freedom of aberration correction. At the same time, a rear focus method is applied to reduce a size of a focus lens group in a radial direction to achieve weight reduction of the focus lens group, and high speed autofocusing is achieved.

PROBLEMS TO BE SOLVED

Since a small-sized imaging apparatus system has a small-sized imaging apparatus body, such a telephoto zoom lens having a high magnification change ratio is required to reduce a size in a direction not only an overall optical length but also a diameter of a lens barrel. However, although the zoom lens disclosed in Japanese Patent Laid-Open No. 2009-265652 intends to reduce a diameter of a lens barrel by making a rear lens group composed of lenses with relatively small diameters a focus lens group, it is not enough to achieve reduction of a size in a an overall optical length direction. Therefore, further downsizing of the zoom lens is required. Further, in the zoom lens disclosed in Japanese Patent Laid-Open No. 2009-265652, as reduction in a movement of the focus lens group in focusing is insufficient, higher speed autofocusing is required.

An object of the present invention is to provide a small-sized zoom lens capable of having high imaging performance and achieving a high magnification change ratio as well as high speed autofocusing, and to provide an imaging apparatus including the zoom lens.

SUMMARY OF THE INVENTION

As a diligent study of the present inventors, the object is achieved by applying a rear focus method to a zoom lens of a telephoto type described below.

The zoom lens according to the present invention is composed of an object side lens group having positive refractive power and an image focusing side lens group having negative refractive power arranged in order from an object side wherein, the object side lens group at least including a first lens group having positive refractive power and a second lens group having negative refractive power in order from the object side, and the image focusing side lens group including a negative lens group A having negative refractive power and a negative lens group B having negative refractive power arranged by facing the negative lens group A across an air distance in order from the object side; and is characterized in that focusing from infinity to a close object is achieved by moving just the negative lens group A toward an image focusing side and satisfy conditional expressions below.

$$-1.80 < \beta 2t < -0.94 \quad (1)$$

$$(1-\beta At^2) \times \beta Bt^2 < -4.5 \quad (2)$$

where "β2t" is lateral magnification at a telephoto end of the second lens group in infinity focusing, "βAt" is lateral magnification at a telephoto end of the negative lens group A in infinity focusing, and "βBt" is lateral magnification at a telephoto end of the negative lens group B in infinity focusing.

In the zoom lens according to the present invention, it is preferable that the image focusing side lens group satisfies the conditional expression below.

$$2.1 < \beta rt < 3.5 \quad (3)$$

where "βrt" is composite lateral magnification at a telephoto end of the image focusing side lens group in infinity focusing.

In the zoom lens according to the present invention, it is preferable that the negative lens group A satisfies the conditional expression below.

$$1.05 < \beta At/\beta Aw < 1.45 \quad (4)$$

where "βAt" is lateral magnification at a telephoto end of the negative lens group A in infinity focusing, and "βAw" is lateral magnification at a wide angle end of the negative lens group A in infinity focusing.

In the zoom lens according to the present invention, it is preferable that the object side lens group is provided a positive lens group C having positive refractive power disposed at most image focusing side facing the negative lens group A in the object side lens group across an air distance.

In the zoom lens according to the present invention, it is preferable that the positive lens group C in the object side lens group and the negative lens group B of the image focusing side lens group move along the same trace in magnification change from the wide angle end to the telephoto end.

In the zoom lens according to the present invention, it is preferable that the first lens group satisfies the conditional expression below.

$$0.5 < f1/\sqrt{(fw \times ft)} < 2.5 \quad (5)$$

where "f1" is a focal length of the first lens group, "fw" is a focal length of the zoom lens at the wide angle end, and "ft" is a focal length of the zoom lens at the telephoto end.

The imaging apparatus according to the present invention includes the zoom lenses described above, and an imaging sensor which converts an optical image formed by the zoom lens into an electric signal provided on the image focusing side of the zoom lenses.

ADVANTAGES OF THE INVENTION

According to the present invention, a small-sized zoom lens capable of having high imaging performance and achieving a high magnification change ratio as well as high speed autofocus, and to provide an imaging apparatus including the zoom lens above can be provided by employing rear focus method by applying a telephoto system of so-called a telephoto type to minimize a movement of each of lens groups in zooming and focusing.

DETAILED DESCRIPTION OF THE PREFERRED EMBODIMENTS

Embodiments of the zoom lens and the imaging apparatus according to the present invention will be described below.

1. Zoom Lens
1-1. Structure of an Optical System

First, a structure of an optical system of the zoom lens according to the present invention will be described. The zoom lens according to the present invention is a zoom lens of so-called a telephoto type composed of an object side lens group having positive refractive power and an image focusing side lens group having negative refractive power arranged in order from an object side. As the zoom lens is a telephoto type, an overall optical length of the zoom lens at the telephoto end can be made shorter than a focal length of the zoom lens at a telephoto end. Accordingly, even if a magnification change ratio is increased to a focal length exceeding 300 mm in terms of 35 mm film, for example, increase of an overall optical length at a telephoto end can be hindered.

In the present invention, the object side lens group at least includes a first lens group having positive refractive power and a second lens group having negative refractive power in order from the object side; and the image focusing side lens group includes a negative lens group A having negative refractive power and a negative lens group B having negative refractive power arranged by facing the negative lens group A across an air distance in order from the object side. The zoom lens is characterized in that just the negative lens group A is moved toward the image focusing side in focusing from infinity to a close object.

In the present invention, negative refractive power in the image focusing side lens group can be easily increased since the zoom lens is a telephoto type as described above and the image focusing side lens group includes the negative lens group A having negative refractive power and the negative lens group B arranged on the image focusing side by facing the negative lens group A across an air distance. Thus, as a zoom lens is easy to a have stronger telephoto tendency, even if a magnification change ratio is increased, overall optical length at a telephoto end can be made shorter than a focal length at the telephoto end.

A zoom lens generally contains one or more inner cylinders in a lens barrel (most outer cylinder) in a telescopic manner. The inner cylinders are drawn to an object side depending on a magnification change ratio. If a difference in overall optical lengths at a telephoto end and a wide angle end increases, a plurality of inner cylinders should be contained in a most outer cylinder to make an overall length of the lens barrel short if the inner cylinders are contained. However, containing the plurality of inner cylinders in the most outer cylinder increases a diameter of the most outer cylinder by thicknesses of the inner cylinders. Thus, in the present invention, as a zoom lens with a stronger telephoto tendency is applied as described above, increase in both an overall optical length at the telephoto end and the number of the inner cylinders to be contained in the most outer cylinder can be prevented even if a magnification change ratio is increased. According to the present invention, not only an outer diameter of the lens barrel but also the overall optical length at the telephoto end can be reduced.

In the present invention, it is preferable that the object side lens group is provided a positive lens group C having positive refractive power disposed at most image focusing side facing the negative lens group A in the object side lens group across an air distance. Arrangement of the positive lens group C having positive refractive power on the most image focusing side of the object side lens group enables a focal length of the object side lens group shorter and it makes an overall optical length of the zoom lens shorter. In addition, as diameter of flux of incident light to the negative lens group A of the image focusing side lens group can be reduced by a convergence action of the positive lens group C, diameters of lenses constituting the image focusing side lens group may be further reduced, i.e. it is preferable for downsizing in the radial direction.

1-2. Motion

Next, a focusing and a magnification change in a zoom lens of the structure described above will be described in order.

(1) Focusing

A focusing will be described. In the zoom lens according to the present invention, just the negative lens group A acts as the focus lens group as described above, and focusing from infinity to a close object is achieved by moving just the negative lens group A toward an image focusing side. As the negative lens group A having relatively small lens diameters compared with each of lenses constituting an object side lens group acts as a focus lens group, not only weight reduction of the focus lens group but also reduced movement of the focus lens group in focusing are achieved. That is, high speed autofocusing is achieved and the zoom lens is downsized.

In order to constitute a zoom lens having a storing telephoto tendency, increase negative refractive power in an image focusing side lens group is required as described above. In a conventional zoom lens of a telephoto type, refractive power of the negative lens group A has been set as negative, and refractive power of the negative lens group B has been set as positive, in general. However, if just the negative lens group A acts as a focus lens group, and the negative lens group A has strong refractive power, aberration fluctuation and a view angle fluctuation occurs depending on movement of the negative lens group A in focusing. Thus, in the present invention, as negative refractive power is also allocated to the negative lens group B subsequent to the negative lens group A, a zoom lens with a strong telephoto tendency as described above is constituted and the aberration fluctuation and the view angle fluctuation in focusing is prevented while preventing the negative refractive power of the negative lens group A from becoming too strong. In an imaging apparatus not provided an optical finder including a mirror-less interchangeable-lens camera, a user performs focusing while viewing a live-view image in a liquid crystal display provided on a back surface of an apparatus body. In this case, if the zoom lens according to the present invention is used, an image with high imaging performance as a live-view image can be displayed while preventing a magnification change action in focusing. Accordingly, the zoom lens according to the present invention is suitably applicable to an imaging apparatus such as a mirror-less interchangeable-lens camera.

In addition, if the positive lens group C described above is provided at a most image focusing side of the object side lens group, further reduction of a diameter of flux of incident light to the negative lens group A can be achieved depending on a convergence action of the positive lens group C, a diameter of each of lenses constituting the negative lens group A can be further reduced. Accordingly, further increased autofocusing and further downsizing in the zoom lens is achieved.

(2) Magnification Change

A magnification change will be described. In the zoom lens according to the present invention, although an motion of each of lens groups is not especially limited in magnification change, it is preferable in view of achieving high imaging performance all over a zooming area by improving a degree of freedom of aberration correction that each of the lens groups relatively move in magnification change for distances change between each of the lens groups. Because distance changes between each of the lens groups in magnification change makes adjustment to a preferable position in aberration correction of each of the lens groups in each of magnification change ratios easy. Note that, distance change between each of the lens groups may be achieved by moving individually each of all the lens groups in magnification change or moving integrally some lens groups of all the lens groups and separately residual lens groups. In addition, all the lens groups may not be a movable lens group, i.e. some lens groups may be a fixed lens group.

In view of increasing freedom in aberration correction, it is preferable to individually move each of all the lens groups in magnification change. However, in view of manufacturing, it is preferable in the present invention that the positive lens group C in the object side lens group and the negative lens group B in the image focusing side lens group are integrally moved along the same trace in magnification change. If the positive lens group C and the negative lens group B arranged back and forth of the negative lens group A acts as the focus lens group integrally move, two lens groups can be manufactured as one unit and manufacturing efficiency is improved and assembling error is prevented. As a result, a lens movement mechanism is simplified compared with a case where the positive lens group C and the negative lens group B are moved separately. In addition, a guide shaft for guiding movement of the negative lens group A can be held from both ends by a lens holding frame for holding each of lens in the positive lens group C and a lens holding frame for holding each of lens in the negative lens group B since the positive lens group C and the negative lens group B are unitized. Accordingly, hold of the guide shaft parallel to an optical axis is made easy to move the negative lens group A stably and it prevent image blur.

In addition, it is preferable in the present invention that when magnification is changed from a wide angle end to a telephoto end, the negative lens group A moves toward the image focusing side with respect to the positive lens group C temporarily, and then moves towardward the object side. As such motion of the negative lens group A in magnification change enables a distances change between the positive lens group C and the negative lens group A; and the negative lens group A and the negative lens group B depending on a magnification change ratio even if the positive lens group C and the negative lens group B move along the same trace, it is preferable for aberration correction.

Since the zoom lens according to the present invention described above is one aspect of the zoom lens according to the present invention, a specific lens structure or the like may be appropriately arranged within a range without departing from the essence of the present invention. In addition, although there is no detailed description above, to further shorten an overall optical length of the zoom lens and to further downsize the zoom lens in a radial direction in the present invention, a lens group having positive refractive power may be provided between the positive lens group C and a second lens group in the object side lens group.

1-3. Conditional Expression

Conditional expressions which the zoom lens according to the present invention should satisfy, or is preferable to be satisfied, will be described. The zoom lens according to the present invention should satisfy conditional expressions (1) and (2) described below, and it is preferable to satisfy conditional expressions (3) to (5) described later.

$$-1.80 < \beta 2t < -0.94 \tag{1}$$

$$(1-\beta At^2) \times \beta Bt^2 < -4.5 \tag{2}$$

where "β2t" is lateral magnification at a telephoto end of the second lens group in infinity focusing, "βAt" is lateral magnification at a telephoto end of the negative lens group A in infinity focusing, and "βBt" is lateral magnification at a telephoto end of the negative lens group B in infinity focusing.

1-3-1. Conditional Expression (1)

First, the conditional expression (1) will be described. The conditional expression (1) specifies lateral magnification at a telephoto end of the second lens group in the zoom lens according to the present invention. As satisfaction of the conditional expression (1) makes lateral magnification at the telephoto end of the second lens group a proper value, the overall optical length at the telephoto end and aberration correction can be properly adjust. If magnification is equal to or less than a lower limit value in the conditional expression (1), the lateral magnification of the second lens group is too large, and many lenses are required for aberration correction to achieve high imaging performance. As a result, the overall optical length at the telephoto end increases. In contrast, if magnification is equal to or more than an upper limit value in the conditional expression (1), the lateral magnification of the second lens group is too small, the lateral magnification in the image focusing side lens group should be increased to achieve a high magnification change ratio. As a result, many lenses are required for aberration correction to achieve high imaging performance. That is, the number of lenses constituting an optical system of the zoom lens increase and overall optical length increases. As described above, magnification of out of the range of the conditional expression (1) is not preferable since downsizing of the zoom lens in either case is made difficult.

In view of the matters above, it is preferable that the conditional expression (1) satisfies a condition below to achieve the effect above.

$$-1.60 < \beta 2t < -0.94 \tag{1)'}$$

In addition, it is more preferable that the conditional expression (1) satisfies a condition below to achieve the effect described above.

$$-1.50 < \beta 2t < -0.94 \tag{1)''}$$

1-3-2. Conditional Expression (2)

Next, the conditional expression (2) will be described. The conditional expression (2) specifies focus sensitivity at a telephoto end of the negative lens group A. Satisfaction of the conditional expression (2) makes focus sensitivity in a telescopic motion a proper value and a movement of the negative lens group A in focusing to be in a proper range. If magnification is equal to or more than an upper limit value in the conditional expression (2) is not preferable for downsizing of the zoom lens since the focus sensitivity is too small and a movement of the negative lens group A in focusing increases.

1-3-3. Conditional Expression (3)

In the zoom lens according to the present invention, it is preferable that the image focusing side lens group satisfies the conditional expression (3) below.

$$2.1 < \beta rt < 3.5 \tag{3}$$

where "βrt" is composite lateral magnification at a telephoto end of the image focusing side lens group in infinity focusing.

The conditional expression (3) specifies lateral magnification of the image focusing side lens group in the zoom lens according to the present invention. The image focusing side lens group includes the negative lens group A and the negative lens group B as described above.

Satisfaction of the conditional expression (3) achieves a downsized zoom lens with high magnification change ratio and a high imaging performance. In addition, satisfaction of the conditional expression (3) secures a proper flange back required for an imaging apparatus including a mirror-less interchangeable-lens camera.

If magnification is equal to or less than a lower limit value in the conditional expression (3), lateral magnification in the image focusing side lens group is too small and lateral magnification in an object side lens group should be large to achieve a high magnification change ratio. As a result, a diameter of each of lenses constituting the object side lens group should be large to make downsizing the zoom lens in a radial direction difficult. Also, reduction of an overall optical length is made difficult. In contrast, if magnification is equal to or more than an upper limit value in the conditional expression (3), the lateral magnification in the image focusing side lens group is too large and many lenses are required for aberration correction to achieve high imaging performance. That is, the number of lenses constituting an optical system of the zoom lens increase to increase the overall optical length. As described above, magnification of out of the range of the conditional expression (3) is not preferable since downsizing of the zoom lens is made difficult in either case.

In view of the matters above, it is more preferable that the conditional expression (3) satisfies a condition below to obtain the effect above.

$$2.2 < \beta rt < 3.5 \tag{3)'}$$

In addition, it is more preferable that the conditional expression (3) satisfies a condition below to obtain the effect described above.

$$2.3 < \beta rt < 3.5 \tag{3)''}$$

1-3-4. Conditional Expression (4)

In the zoom lens according to the present invention, it is preferable that the negative lens group A satisfies the conditional expression (4) below.

$$1.05 < \beta At/\beta Aw < 1.45 \tag{4}$$

where "βAt" is lateral magnification at a telephoto end of the negative lens group A in infinity focusing, and "βAw" is lateral magnification at a wide angle end of the negative lens group A in infinity focusing.

The conditional expression (4) specifies a magnification change ratio of the negative lens group A. In the zoom lens according to the present invention, the negative lens group A acts as a focus lens group as described above, and just the negative lens group A moves in focusing. Satisfaction of the conditional expression (4) makes magnification change ratios from the wide angle end to the telephoto end in the negative lens group A in a proper range, to make control of aberration fluctuation and view angle fluctuation in focusing described above easy. As a result, the effect described above can be enhanced by making the negative lens group A act as the focus lens group.

1-3-5. Conditional Expression (5)

Next, the conditional expression (5) will be described. In the zoom lens according to the present invention, it is preferable that the first lens group satisfies the conditional expression (5) below.

$$0.5 < f1/\sqrt{(fw \times ft)} < 2.5 \tag{5}$$

where "f1" is a focal length of the first lens group, "fw" is a focal length of the zoom lens at the wide angle end, and "ft" is a focal length of the zoom lens at the telephoto end.

The conditional expression (5) specifies a focal length of the first lens group. As satisfaction of the conditional expression (5) makes a movement of the first lens group in magnification change in a proper range, high imaging performance while preventing an increase in the number of lenses for aberration correction is achieved. So, it is preferable for downsizing of the zoom lens.

If the value is equal to or less than a lower limit value in the conditional expression (5), refractive power of the first lens group is too large and axial color aberration at the telephoto end deteriorates. As a result, many lenses are required for aberration correction to achieve high imaging performance. In view of downsizing the zoom lens, it is not preferable that increased number of lenses increase the overall optical length. In contrast, if the value is equal to or more than an upper limit value in the conditional expression (5), refractive power of the first lens group is too small and a movement of the first lens group in magnification change increases. As a result, a difference in overall optical lengths at the wide angle end and the telephoto end increases. If so, the number of inner cylinders to be contained in an outer cylinder increase or a mechanism of drawing the inner cylinders is made complicate since the difference in overall optical lengths at the wide angle end and the telephoto end increases. That is, it is not preferable since a lens barrel structure is made complicate to increase an outer diameter of the lens barrel.

In view of the matters above, it is more preferable that the conditional expression (5) satisfies a condition below to achieve the effect above.

$$0.6 < f1/\sqrt{(fw \times ft)} < 2.2 \tag{5}'$$

In addition, it is more preferable that the conditional expression (5) satisfies a condition below to obtain the effect described above.

$$0.7 < f1/\sqrt{(fw \times ft)} < 2.0 \tag{5}''$$

2. Imaging Apparatus

Next, the imaging apparatus according to the present invention will be described. The imaging apparatus according to the present invention includes the zoom lens described above, and an imaging sensor which converts an optical image formed by the zoom lens into an electric signal provided on the image focusing side of the zoom lenses. There is no specific limitation on the imaging sensor. However, as described above, the zoom lens is suitable for an imaging apparatus of a type not provided an optical finder and/or a reflex mirror since a flange back of the zoom lens according to the present invention can be made short. In particular, as the zoom lens according to the present invention is small and can achieves a high magnification change ratio, therefore, the imaging apparatus is preferable to act as a small-sized imaging apparatus provided with a small-sized solid state imaging sensor including so-called mirror-less interchangeable-lens camera.

The present invention will be specifically described by showing Examples and Comparative Examples. The present invention is not limited to the Examples below, and lens structures disclosed in the Examples below just exemplify the zoom lens according to the present invention. So, the lens structure of the zoom lens according to the present invention can be appropriately arranged without departing from the essence of the present invention.

Example 1

(1) Example of a Lens Structure of a Zoom Lens

Figure 1:
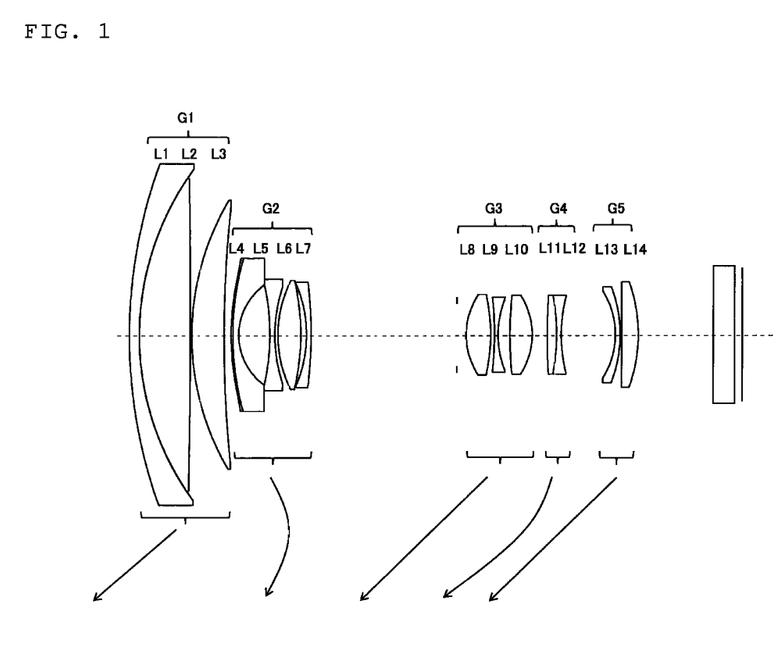
FIG. 1 is a schematic sectional view of the zoom lens in Example 1 showing a structural example of the zoom lens at a wide angle end.

FIG. 1 shows Example of a lens structure of a zoom lens in Example 1. As shown in FIG. 1, the zoom lens in the Example 1 includes: in order from an object side, a first lens group G1 having positive refractive power; a second lens group G2 having negative refractive power; a third lens group G3 acts as a positive lens group C having positive refractive power; a fourth lens group G4 acts as a negative lens group A having negative refractive power; and a fifth lens group G5 acts as a negative lens group B having negative refractive power. The first lens group G1 to the third lens group G3 constitute the object side lens group, and the fourth lens group G4 and the fifth lens group G5 constitute the image focusing side lens group.

The first lens group G1 includes: in order from the object side, a cemented lens in which a meniscus lens L1 provided with a convex facing the object side, having a negative refractive power, and a lens L2 having positive refractive power, are cemented; and a meniscus lens L3 provided with a convex facing the object side, having a positive refractive power. The second lens group G2 includes: in order from the object side, a meniscus lens L4 provided on its object side with an aspherical surface and on its image focusing side with a concave having a large curvature, the meniscus lens L4 having negative refractive power; a biconcave lens L5; a biconvex lens L6; and a meniscus lens L7 provided with a concave facing the object side, having negative refractive power. The third lens group G3 includes: in order from the object side, a biconvex lens L8 provided on its each of both sides with an aspherical surface; a biconcave lens L9; and biconvex lens L10. The forth lens group G4 includes: a cemented lens in which, in order from the object side, a biconvex lens L11 and a biconcave lens L12 provided on its image focusing side with an aspherical surface are cemented. The fifth lens group G5 includes: a meniscus lens L13 provided with a concave facing the object side, having negative refractive power; and a meniscus lens L14 provided with a convex facing the image focusing side, having positive refractive power.

In the zoom lens in the Example 1 having the structure above, each of the lens groups moves as follows in magnification change from a wide angle end to a telephoto end as shown in FIG. 1 with an arrow: the first lens group G1 moves toward the object side; the second lens group G2 moves toward the image focusing side by drawing a convex trace; the third lens group G3 moves toward the object side; the fourth lens group G4 moves toward the image focusing side with respect to the third lens group G3 by drawing a convex trace; and the fifth lens group G5 moves toward the object side. In addition, the fourth lens group G4 moves toward the image focusing side in focusing from infinity to a close object.

(2) Examples of Numeric Values

In the Example 1, lens data of Example 1 of numeric values to which specific numeric values are applied is shown in Table 1. The lens data shown in Table 1 is as follows: "NS" denotes a face number of a lens and denotes order of lens surfaces from the object side; "R" denotes a curvature radius of a lens surface; "D" denotes a distance between lens surfaces adjacent to each other along an optical axis; "Nd" denotes a refractive index with respect to a d-line (wavelength λ of 587.6 nm); and "vd" denotes an Abbe number with respect to the d-line (wavelength λ of 587.6 nm). In addition, a diaphragm is denoted as a character of "S" in FIG. 1. In Table 1, "STOP" is denoted as a face number of the diaphragm (opening diaphragm). If a lens surface is an aspherical surface, "ASPH" is designated as a face number, and a paraxial curvature radius is shown in a section of the curvature radius "R".

TABLE 1

| NS | R | D | Nd | vd |
|---|---|---|---|---|
| 1 | 64.9819 | 1.3000 | 1.90366 | 31.31 |
| 2 | 36.3975 | 0.0100 | 1.56732 | 42.84 |
| 3 | 36.3975 | 6.6600 | 1.49700 | 81.61 |
| 4 | −1186.1757 | 0.2000 | | |
| 5 | 34.2934 | 4.2232 | 1.61800 | 63.39 |
| 6 | 162.5347 | D(6) | | |
| 7 ASPH | 33.6698 | 0.2000 | 1.51460 | 49.96 |
| 8 | 36.8067 | 0.8000 | 1.91082 | 35.25 |
| 9 | 8.1262 | 4.0531 | | |
| 10 | −29.8667 | 0.6500 | 1.91082 | 35.25 |
| 11 | 20.0064 | 0.4000 | | |
| 12 | 15.8824 | 2.9802 | 1.92286 | 20.88 |
| 13 | −31.7119 | 0.7663 | | |
| 14 | −16.6818 | 0.6000 | 1.77250 | 49.62 |
| 15 | −54.0405 | D(15) | | |
| 16 STOP | 0.0000 | 1.2000 | | |
| 17 ASPH | 9.0025 | 3.2330 | 1.58313 | 59.46 |
| 18 ASPH | −17.0238 | 0.4600 | | |
| 19 | −52.2330 | 0.5000 | 1.90366 | 31.31 |
| 20 | 12.6447 | 1.5345 | | |
| 21 | 46.2818 | 2.9182 | 1.59282 | 68.62 |
| 22 | −9.5695 | D(22) | | |
| 23 | 100.3805 | 1.2000 | 1.80518 | 25.46 |
| 24 | −28.6956 | 0.0100 | 1.56732 | 42.84 |
| 25 | −28.6956 | 0.6000 | 1.80139 | 45.45 |
| 26 ASPH | 19.7020 | D(26) | | |
| 27 | −10.7494 | 0.6300 | 1.80518 | 25.46 |
| 28 | −17.3803 | 0.2000 | | |
| 29 | −4854.1028 | 2.1691 | 1.48749 | 70.44 |
| 30 | −20.5041 | D(30) | | |
| 31 | 0.0000 | 9.8000 | | |
| 32 | 0.0000 | 2.8000 | 1.51680 | 64.20 |
| 33 | 0.0000 | 1.0000 | | |

Table 2 shows aspherical surface coefficients and conic constants if a shape of an aspherical surface shown in Table 1 is expressed by the following expression X(y).

$$X(y) = (y^2/R)/[1+(1-\epsilon \cdot y^2/R^2)^{1/2}] + A4 \cdot y^4 + A6 \cdot y^6 + A8 \cdot y^8 + A10 \cdot y^{10}$$

In the expression above, "X(y)" denotes a distance (sagging amount) from a peak of each of aspherical surfaces at a height y from the optical axis in a vertical direction, along the optical axis direction, and "R" denotes a curvature radius (paraxial curvature radius) of a reference sphere surface, "ϵ" designating a conic coefficient, and each of "A4, A6, A8, and A10" denote an aspherical surface coefficient.

TABLE 2

| ASPH | ϵ | A4 | A6 | A8 | A10 |
|---|---|---|---|---|---|
| 7 | 1.0000 | −1.81150e−006 | −3.53409e−007 | 2.30973e−009 | −1.22024e−011 |
| 17 | 1.0000 | −1.28660e−004 | 1.17974e−006 | −4.72888e−008 | −2.76128e−009 |
| 18 | 1.0000 | 4.39407e−004 | 1.33550e−006 | −1.82741e−007 | 0.00000e+000 |
| 26 | 1.0000 | −2.01216e−005 | −1.13690e−006 | 1.04261e−007 | −2.22909e−009 |

Table 3 shows a surface distance in each of states of a wide angle end (f=10.31), an intermediate focal length (f=41.50), and a telephoto end (f=100.60) in the Example 1 of numeric values as well as a focal length (f), an F-number (F-No.), and a field angle (ω) in each of the states.

TABLE 3

| F | 10.31 | 41.50 | 100.60 |
|---|---|---|---|
| F-No. | 3.657 | 5.267 | 5.799 |
| ω | 40.1947 | 10.9138 | 4.5726 |
| D(6) | 0.9310 | 19.9590 | 33.2042 |
| D(15) | 19.0512 | 4.6009 | 1.6230 |
| D(22) | 1.9788 | 3.7822 | 0.5120 |
| D(26) | 7.0763 | 5.2729 | 8.5431 |
| D(30) | 0.0000 | 13.7884 | 20.1450 |

Table 4 shows a surface distance in focusing at an close object in each of states of a wide angle end (f=10.31), an intermediate focal length (f=41.50), and a telephoto end (f=100.60) in the Example 1 of numeric values as well as a focal length (f) in focusing at an infinite object, and a distance (D(0)) from a first lens surface to an object in each of the states.

TABLE 4

| f | 10.31 | 41.50 | 100.60 |
|---|---|---|---|
| D(0) | 919.86 | 901.49 | 884.90 |
| D(22) | 2.0430 | 4.3047 | 2.5769 |
| D(26) | 7.0121 | 4.7504 | 6.4782 |

Figure 2:
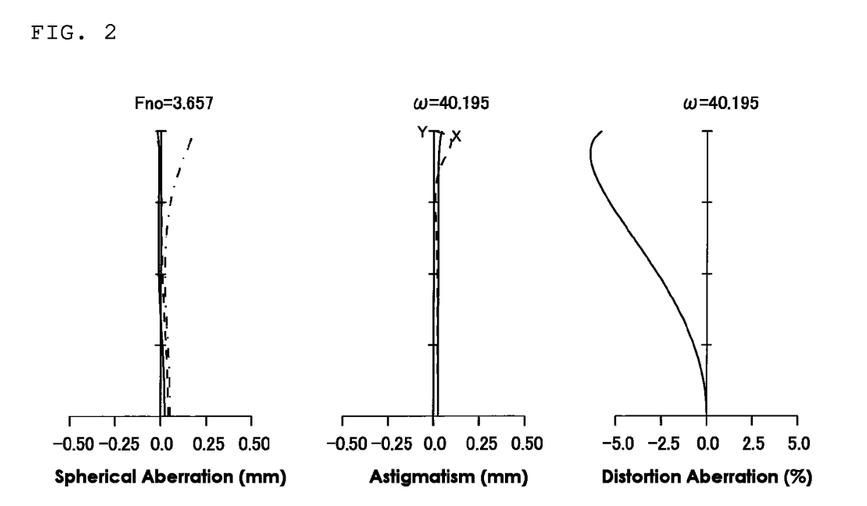
FIG. 2 includes a spherical aberration graph, an astigmatism graph, and a distortion aberration graph, in a state in which the zoom lens in Example 1 at the wide angle end is focused on infinity.
Figure 3:
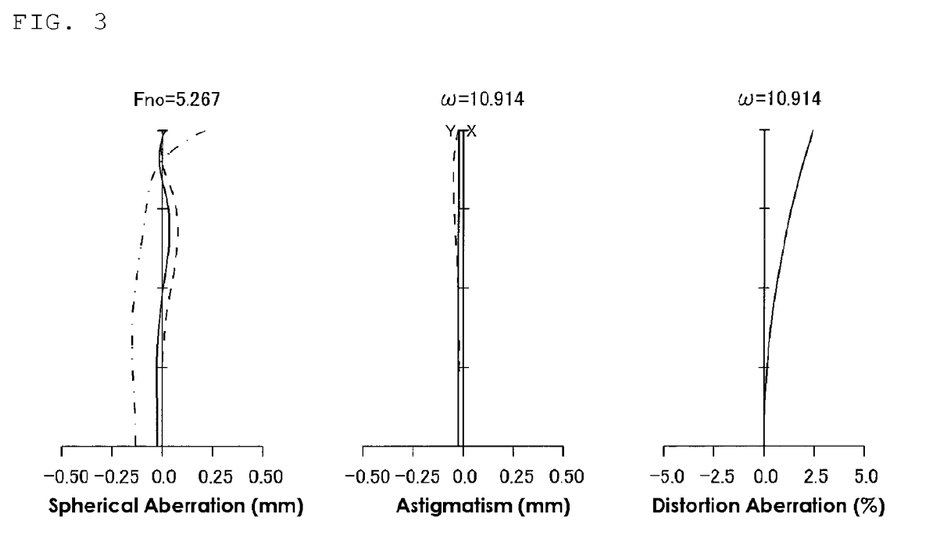
FIG. 3 includes a spherical aberration graph, an astigmatism graph, and a distortion aberration graph, in a state in which the zoom lens in Example 1 at an intermediate focal length is focused on infinity.
Figure 4:
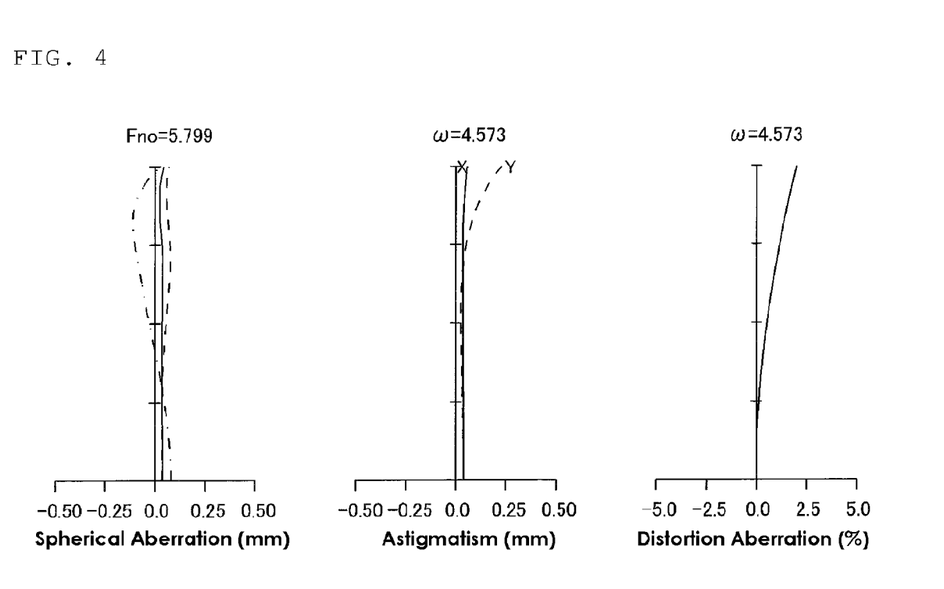
FIG. 4 includes a spherical aberration graph, an astigmatism graph, and a distortion aberration graph, in a state in which the zoom lens in Example 1 at a telephoto end is focused on infinity.

FIG. 2 shows spherical aberration, astigmatism, and distortion aberration, in focusing at infinity of the zoom lens in Example 1 of numeric values above in a wide angle end. FIG. 3 shows spherical aberration, astigmatism, and distortion aberration, in focusing at infinity of the zoom lens in an intermediate focal length. FIG. 4 shows spherical aberration, astigmatism, and distortion aberration, in focusing at infinity of the zoom lens at a telephoto end.

Example 2

(1) Example of a Structure of a Zoom Lens

Figure 5:
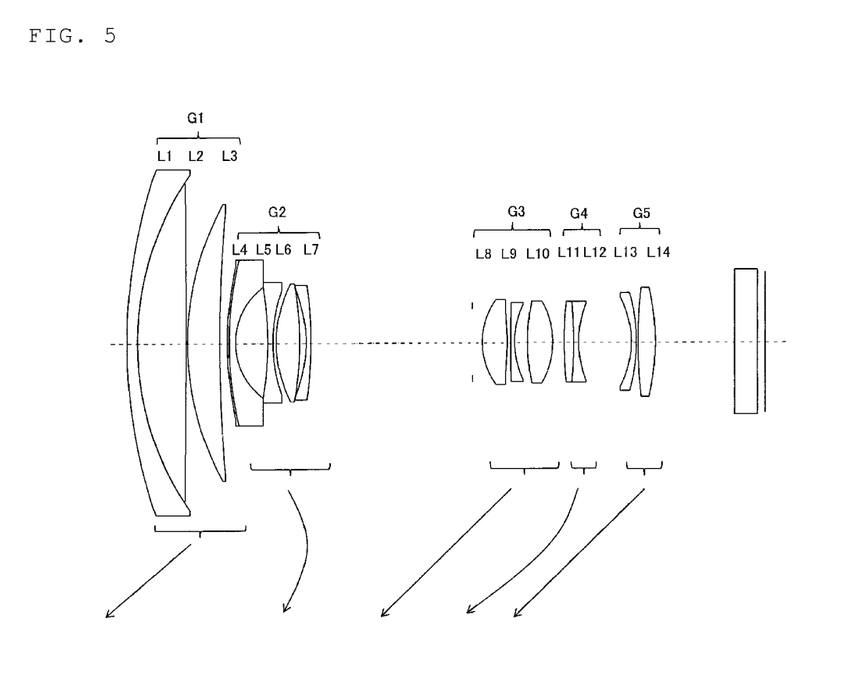
FIG. 5 is a schematic sectional view of the zoom lens in Example 2 showing a structure of the zoom lens at a wide angle end.

FIG. 5 shows Example of a lens structure of a zoom lens in the Example 2. As shown in FIG. 5, the zoom lens in the Example 2 includes: in order from an object side, a first lens group G1 having positive refractive power; a second lens group G2 having negative refractive power; a third lens group G3 acts as a positive lens group C having positive refractive power; a fourth lens group G4 acts as a negative lens group A having negative refractive power; and a fifth lens group G5 acts as a negative lens group B having negative refractive power. In the Example 2 as well as the Example 1, the first lens group to the third lens group constitute the object side lens group, and the fourth lens group and the fifth lens group constitute the image focusing side lens group.

The first lens group G1 includes: in order from the object side, a cemented lens in which a meniscus lens L1 provided with a convex facing the object side, having a negative refractive power, and a lens L2 having positive refractive power, are cemented; and a meniscus lens L3 provided with a convex facing the object side, having a positive refractive power. The second lens group G2 includes: in order from the object side, a meniscus lens L4 provided on its object side with an aspherical surface and on its image focusing side with a concave having a large curvature, the meniscus lens L4 having negative refractive power; a biconcave lens L5; a biconvex lens L6; and a meniscus lens L7 provided with a concave facing the object side, having negative refractive power. The third lens group G3 includes: in order from the object side, a biconvex lens L8 provided on its each of both sides with an aspherical surface; a biconcave lens L9; and biconvex lens L10. The fourth lens group G4 includes: a cemented lens in which in order from the object side, a biconvex lens L11 and a biconcave lens L12 provided on its image focusing side with an aspherical surface are cemented. The fifth lens group G5 includes: a meniscus lens L13 provided with a concave facing the object side, having negative refractive power; and a biconvex lens L14.

In the zoom lens in the Example 2 having the structure above, each of the lens groups moves as follows in magnification change from a wide angle end to a telephoto end as shown in FIG. 5 with an arrow: the first lens group G1 moves toward the object side; the second lens group G2 moves toward the image focusing side by drawing a convex trace; the third lens group G3 moves toward the object side; the fourth lens group G4 moves toward the image focusing side with respect to the third lens group G3 by drawing a convex trace; and the fifth lens group G5 moves toward the object side. In addition, the fourth lens group G4 moves toward the image focusing side in focusing from infinity to a close object.

(2) Examples of Numeric Values

In the Example 2, Table 5 shows lens data of Example 2 of numeric values to which specific numeric values are applied. The lens data shown in Table 5 is similar to the lens data shown in Table 1.

TABLE 5

| NS | R | D | Nd | vd |
|---|---|---|---|---|
| 1 | 65.0172 | 1.3000 | 1.91048 | 31.31 |
| 2 | 36.2100 | 0.0100 | 1.57046 | 42.84 |
| 3 | 36.2100 | 6.0000 | 1.49845 | 81.61 |
| 4 | −2179.5150 | 0.2000 | | |
| 5 | 35.2814 | 4.0027 | 1.62032 | 63.39 |
| 6 | 183.6531 | D(6) | | |
| 7 ASPH | 42.2125 | 0.2000 | 1.51700 | 49.96 |
| 8 | 42.6979 | 0.8000 | 1.91695 | 35.25 |
| 9 | 8.4806 | 4.0102 | | |
| 10 | −40.2053 | 0.6500 | 1.91695 | 35.25 |
| 11 | 19.8739 | 0.4000 | | |
| 12 | 15.7705 | 2.9108 | 1.93323 | 20.88 |
| 13 | −39.4484 | 0.7583 | | |
| 14 | −17.4656 | 0.6000 | 1.77621 | 49.62 |

TABLE 5-continued

| NS | R | D | Nd | vd |
|---|---|---|---|---|
| 15 | −52.0671 | D(15) | | |
| 16 STOP | 0.0000 | 1.2000 | | |
| 17 ASPH | 8.5883 | 3.0750 | 1.58547 | 59.46 |
| 18 ASPH | −25.0697 | 0.4400 | | |
| 19 | 171.5901 | 0.5000 | 1.91048 | 31.31 |
| 20 | 10.4093 | 1.6207 | | |
| 21 | 25.6522 | 3.1313 | 1.59489 | 68.62 |
| 22 | −9.9776 | D(22) | | |
| 23 | 46.2354 | 1.2000 | 1.81263 | 25.46 |
| 24 | −53.2640 | 0.0100 | 1.57046 | 42.84 |
| 25 | −53.2640 | 0.6000 | 1.80558 | 45.45 |
| 26 ASPH | 13.2084 | D(26) | | |
| 27 | −11.9913 | 0.6300 | 1.81263 | 25.46 |
| 28 | −21.7212 | 0.2000 | | |
| 29 | 57.2469 | 2.1490 | 1.48914 | 70.44 |
| 30 | −29.7248 | D(30) | | |
| 31 | 0.0000 | 2.8000 | 1.51872 | 64.20 |
| 32 | 0.0000 | 1.0000 | | |

Table 6 shows aspherical surface coefficients and conic constants of the aspherical surface shown in Table 5 as well as Table 2 shows aspherical surface coefficients and conic constants.

TABLE 6

| ASPH | ε | A4 | A6 | A8 | A10 |
|---|---|---|---|---|---|
| 7 | 1.0000 | 8.18698e−006 | −2.73054e−007 | 1.74363e−009 | −8.23298e−012 |
| 17 | 1.0000 | −1.01823e−004 | 2.84220e−006 | −6.99155e−008 | −7.96183e−010 |
| 18 | 1.0000 | 4.60590e−004 | 3.18830e−006 | −1.41926e−007 | 0.00000e+000 |
| 26 | 1.0000 | −1.47382e−005 | −1.68264e−006 | 1.30906e−007 | −2.85225e−009 |

Next, Table 7 shows a surface distance in each of states of a wide angle end (f=10.30), an intermediate focal length (f=38.91), and a telephoto end (f=100.21) in the Example 2 of numeric values as well as a focal length (f), an F-number (F-No.), and a field angle (ω) in each of the states.

TABLE 7

| F | 10.30 | 38.91 | 100.21 |
|---|---|---|---|
| F-No. | 3.6579 | 5.0177 | 5.8760 |
| ω | 40.250 | 11.571 | 4.601 |
| D(6) | 0.9300 | 21.0041 | 33.8012 |
| D(15) | 19.9939 | 5.7856 | 1.5907 |
| D(22) | 1.3754 | 2.5090 | 0.5000 |
| D(26) | 6.4996 | 5.3660 | 7.3750 |
| D(30) | 9.8031 | 20.7424 | 28.8244 |

Table 8 shows a surface distance in focusing at an close object in each of states of a wide angle end (f=10.30), an intermediate focal length (f=38.91), and a telephoto end (f=100.21) in the Example 2 of numeric values as well as a focal length (f) in focusing at an infinite object, and a distance (D(0)) from a first lens surface to an object in each of the states.

TABLE 8

| f | 10.30 | 38.91 | 100.21 |
|---|---|---|---|
| D(0) | 921.00 | 904.19 | 887.51 |
| D(22) | 1.4167 | 2.8588 | 1.9523 |
| D(26) | 6.4584 | 5.0162 | 5.9227 |

Figure 6:
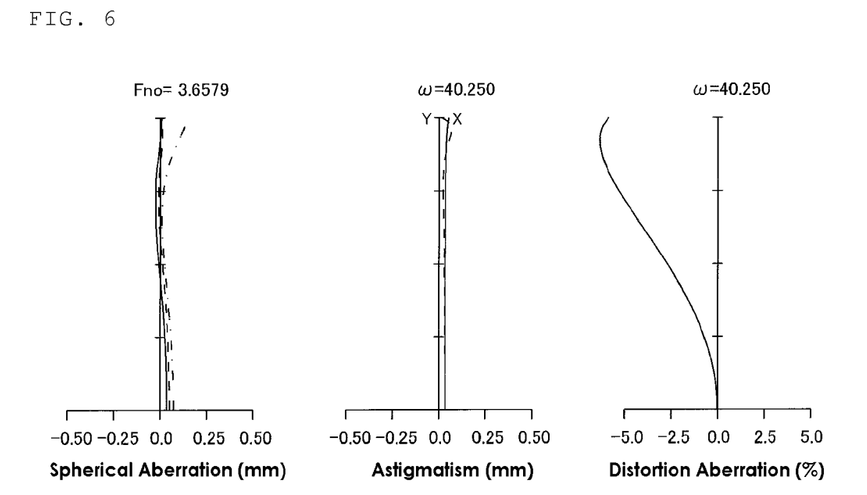
FIG. 6 includes a spherical aberration graph, an astigmatism graph, and a distortion aberration graph, in a state in which the zoom lens in Example 2 at the wide angle end is focused on infinity.
Figure 7:
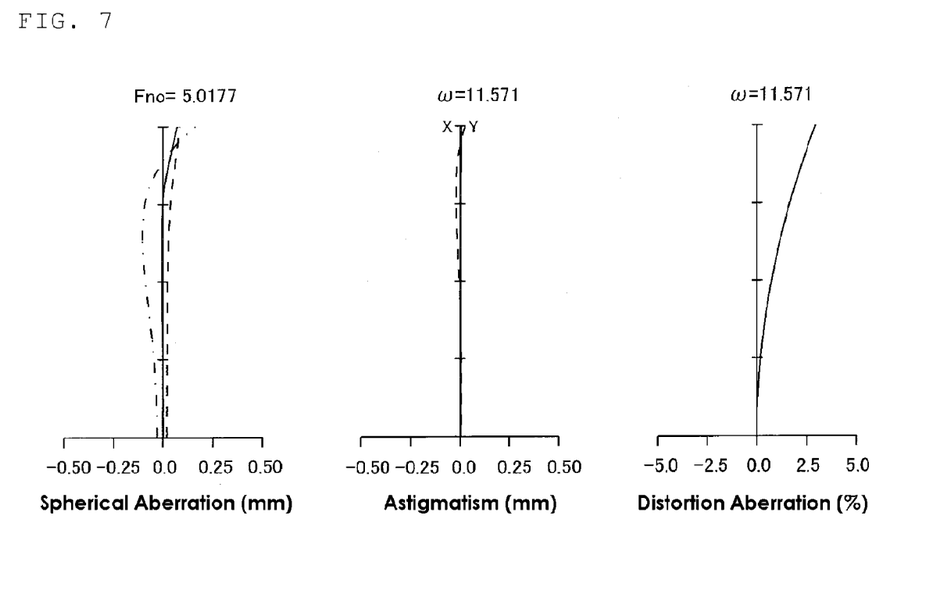
FIG. 7 includes a spherical aberration graph, an astigmatism graph, and a distortion aberration graph, in a state in which the zoom lens in Example 2 at an intermediate focal length is focused on infinity.
Figure 8:
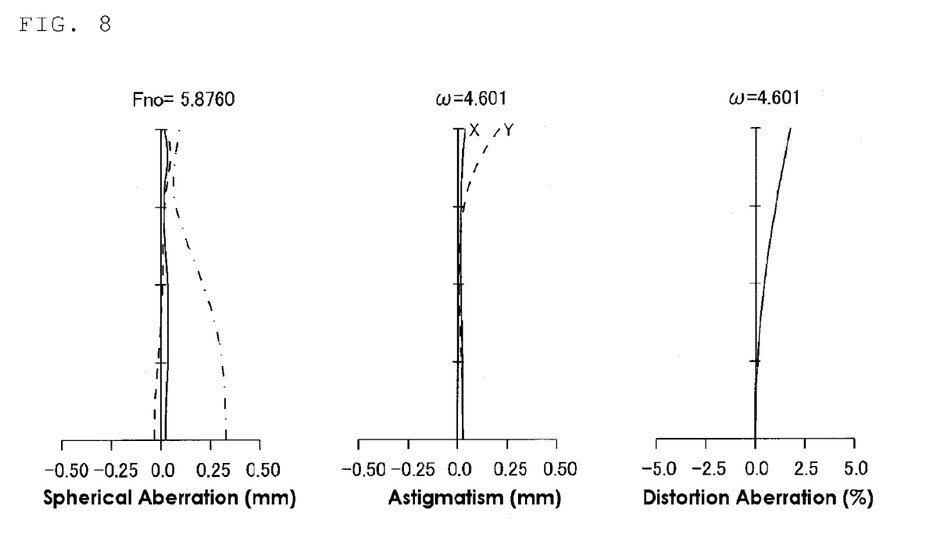
FIG. 8 includes a spherical aberration graph, an astigmatism graph, and a distortion aberration graph, in a state in which the zoom lens in Example 2 at a telephoto end is focused on infinity.

FIG. 6 shows spherical aberration, astigmatism, and distortion aberration, in focusing at infinity of the zoom lens in Example 2 of numeric values above in a wide angle end. FIG. 7 shows spherical aberration, astigmatism, and distortion aberration, in focusing at infinity of the zoom lens in an intermediate focal length. FIG. 8 shows spherical aberration, astigmatism, and distortion aberration, in focusing at infinity of the zoom lens at a telephoto end.

Example 3

(1) Example of a Structure of a Zoom Lens

Figure 9:
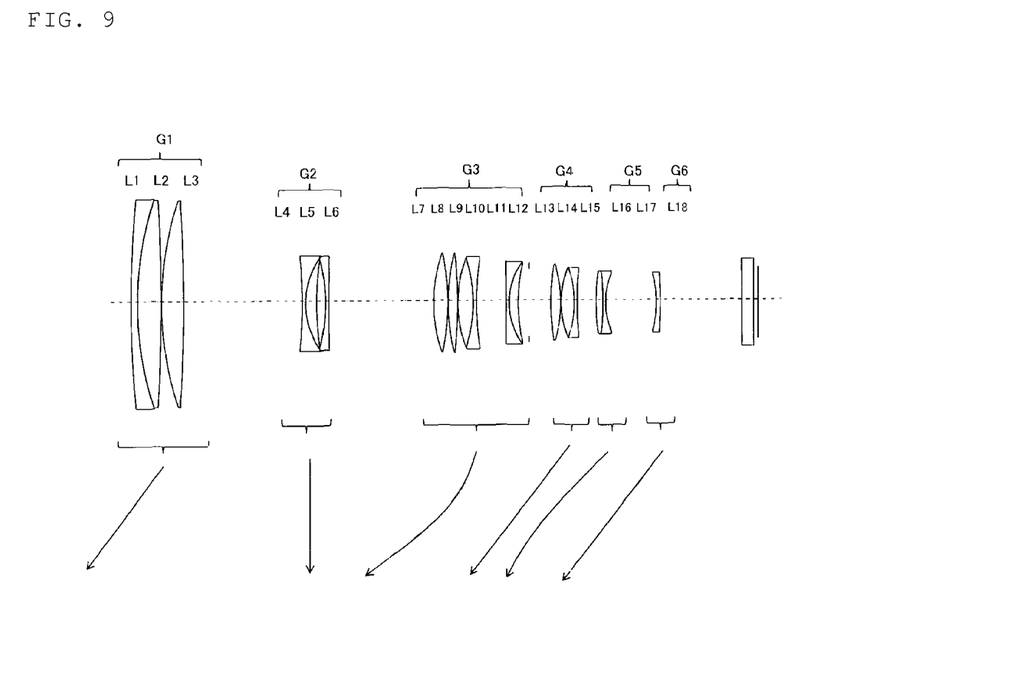
FIG. 9 is a schematic sectional view of the zoom lens in Example 3 showing a structure of the zoom lens at a wide angle end.

FIG. 9 shows Example of a lens structure of a zoom lens in Example 3. As shown in FIG. 9, the zoom lens in the Example 3 includes: in order from an object side, a first lens group G1 having positive refractive power; a second lens group G2 having negative refractive power; a third lens group G3 having positive refractive power; a fourth lens group G4 acts as a positive lens group C having positive refractive power; a fifth lens group G5 acts as a negative lens group A having negative refractive power; and a sixth lens group G6 acts as a negative lens group B having negative refractive power.

The first lens group G1 includes, in order from the object side: a cemented lens in which a meniscus lens L1 provided with a convex facing the object side, having a negative refractive power, and a lens L2 having positive refractive power, are cemented; and a lens L3 provided with a convex facing the object side, having a positive refractive power. The second lens group G2 includes, in order from the object side: a biconcave lens L4; a meniscus lens L5 provided with a convex facing the object side, having positive refractive power; and a lens L6 provided with a concave facing the object side, having negative refractive power. The third lens group G3 includes, in order from the object side: a biconvex lens L7; a biconvex lens L8; a cemented lens in which a biconvex lens L9 and a biconcave lens L10 are cemented; and a cemented lens in which a biconcave lens L11 and a lens L12 provided with a convex facing the object side, having positive refractive power. The fourth lens group G4 includes, in order from the object side: a biconvex lens L13; and a cemented lens in which a biconvex lens L14 and a biconcave lens L15 are cemented. The fifth lens group G5 includes a cemented lens in which a biconvex lens L16 and a biconcave lens L17 are cemented. The sixth lens group G6 includes a lens L18 provided with a concave facing the object side, having negative refractive power.

In the zoom lens in the Example 3 having the structure above, each of the lens groups moves as follows in magnification change from a wide angle end to a telephoto end as shown in FIG. 9 with an arrow: the first lens group G1 moves toward the object side; the second lens group G2 act as a fixed lens group and is fixed with respect to the image surface; the third lens group G3 moves toward the object side; the fourth lens group G4 moves toward the object side; the fifth lens group G5 moves toward the object side; and the sixth lens group G6 moves toward the object side. In addition, the fifth lens group G5 moves toward the image focusing side in focusing from infinity to a close object.

(2) Examples of Numeric Values

In the Example 3, Table 9 shows lens data of Example 3 of numeric values to which specific numeric values are applied.

TABLE 9

| NS | R | D | Nd | νd |
|---|---|---|---|---|
| 1 | 249.5578 | 1.5000 | 1.83400 | 37.34 |
| 2 | 76.6801 | 0.0100 | 1.56732 | 42.84 |
| 3 | 76.6801 | 5.4040 | 1.49700 | 81.61 |
| 4 | −415.9125 | 0.1500 | | |
| 5 | 74.9171 | 5.1230 | 1.48749 | 70.44 |
| 6 | −373.1804 | D(6) | | |
| 7 | −113.5760 | 0.8000 | 1.74546 | 49.68 |
| 8 | 18.2990 | 0.0100 | 1.56732 | 42.84 |
| 9 | 18.2990 | 2.5665 | 1.80518 | 25.46 |
| 10 | 69.1683 | 1.9870 | | |
| 11 | −41.5554 | 0.8000 | 1.80420 | 46.50 |
| 12 | 1027.6603 | D(12) | | |
| 13 | 34.0523 | 3.3030 | 1.49700 | 81.61 |
| 14 | −52.3911 | 0.1000 | | |
| 15 | 47.0749 | 2.1776 | 1.48749 | 70.44 |
| 16 | −106.4688 | 0.1000 | | |
| 17 | 30.8990 | 3.4205 | 1.48749 | 70.44 |
| 18 | −33.1763 | 0.0100 | 1.56732 | 42.84 |
| 19 | −33.1763 | 0.8000 | 1.90888 | 34.10 |
| 20 | 66.1108 | 6.8000 | | |
| 21 | −503.4365 | 0.7000 | 1.77554 | 43.58 |
| 22 | 15.8629 | 0.0100 | 1.56732 | 42.84 |
| 23 | 15.8629 | 2.1182 | 1.90366 | 31.31 |
| 24 | 40.2035 | 2.4723 | | |
| 25 STOP | 0.0000 | D(25) | | |
| 26 | 54.7228 | 2.3101 | 1.60241 | 37.99 |
| 27 | −29.1238 | 0.1000 | | |
| 28 | 21.8055 | 2.9393 | 1.52364 | 53.81 |
| 29 | −24.6681 | 0.0100 | 1.56732 | 42.84 |
| 30 | −24.6681 | 0.6750 | 1.90366 | 31.31 |
| 31 | 80.8965 | D(31) | | |
| 32 | 49.9105 | 1.5000 | 1.80518 | 25.46 |
| 33 | −60.6167 | 0.0100 | 1.56732 | 42.84 |
| 34 | −60.6167 | 0.5880 | 1.76157 | 48.92 |
| 35 | 16.7139 | D(35) | | |
| 36 | −25.3286 | 0.9400 | 1.48749 | 70.44 |
| 37 | −95.5860 | D(37) | | |
| 38 | 0.0000 | 2.8000 | 1.51680 | 64.20 |
| 39 | 0.0000 | 1.0000 | | |

Next, Table 10 shows a surface distance in each of states of a wide angle end (f=72.10), an intermediate focal length (f=148.41), and a telephoto end (f=291.00) in the Example 3 of numeric values as well as a focal length (f), an F-number (F-No.), and a field angle (ω) in each of the states.

TABLE 10

| F | 72.10 | 148.41 | 291.00 |
|---|---|---|---|
| F-No. | 4.2519 | 4.9044 | 6.3077 |
| ω | 6.488 | 3.162 | 1.614 |
| D(6) | 27.2994 | 56.7662 | 66.8379 |
| D(12) | 24.1336 | 17.3427 | 1.5720 |
| D(25) | 5.0483 | 4.0747 | 6.4009 |
| D(31) | 4.4201 | 1.5040 | 2.8355 |
| D(35) | 11.7641 | 14.6802 | 13.3487 |
| D(37) | 18.6600 | 26.4245 | 39.8695 |

Table 11 shows a surface distance in focusing at an close object in each of states of a wide angle end (f=14.43), an intermediate focal length (f=57.85), and a telephoto end (f=145.40) in the Example 3 of numeric values as well as a focal length (f) in focusing at an infinite object, and a distance (D(0)) from a first lens surface to an object in each of the states.

TABLE 11

| F | 72.10 | 148.41 | 291.00 |
|---|---|---|---|
| D(0) | 1055.44 | 1025.97 | 1015.90 |
| D(31) | 5.6636 | 4.7678 | 11.7660 |
| D(35) | 10.5206 | 11.4164 | 4.4182 |

Figure 10:
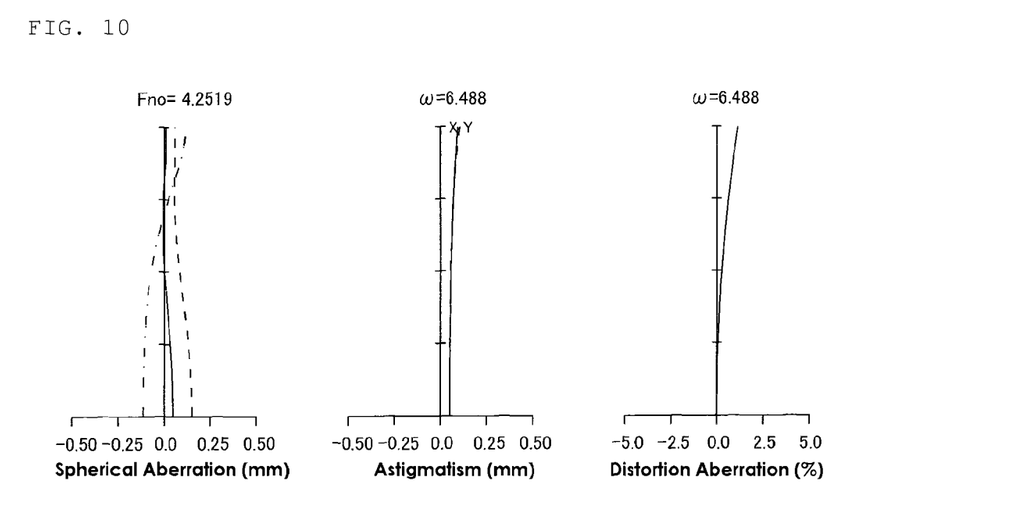
FIG. 10 includes a spherical aberration graph, an astigmatism graph, and a distortion aberration graph, in a state in which the zoom lens in Example 3 at the wide angle end is focused on infinity.
Figure 11:
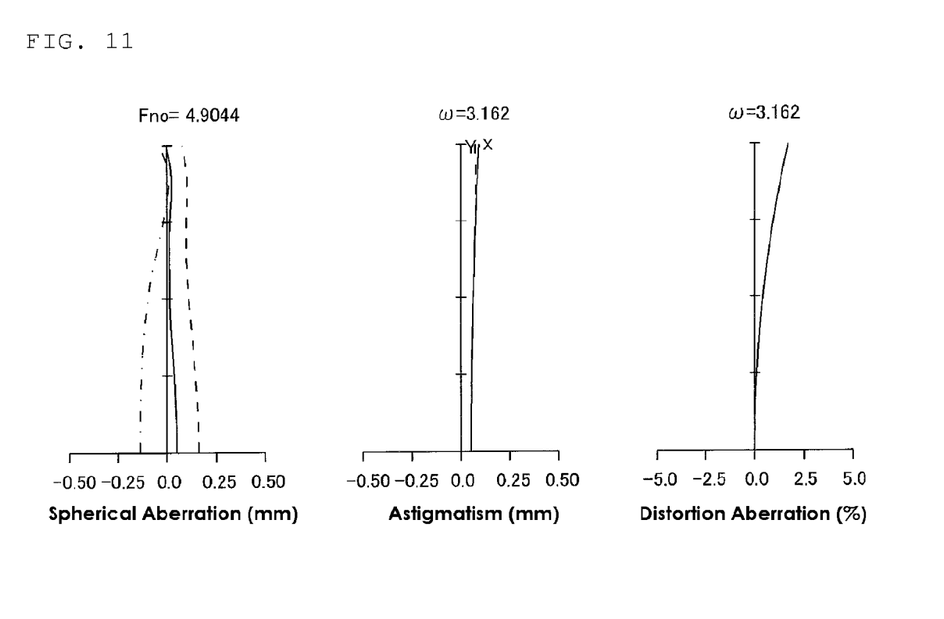
FIG. 11 includes a spherical aberration graph, an astigmatism graph, and a distortion aberration graph, in a state in which the zoom lens in Example 3 at an intermediate focal length is focused on infinity.
Figure 12:
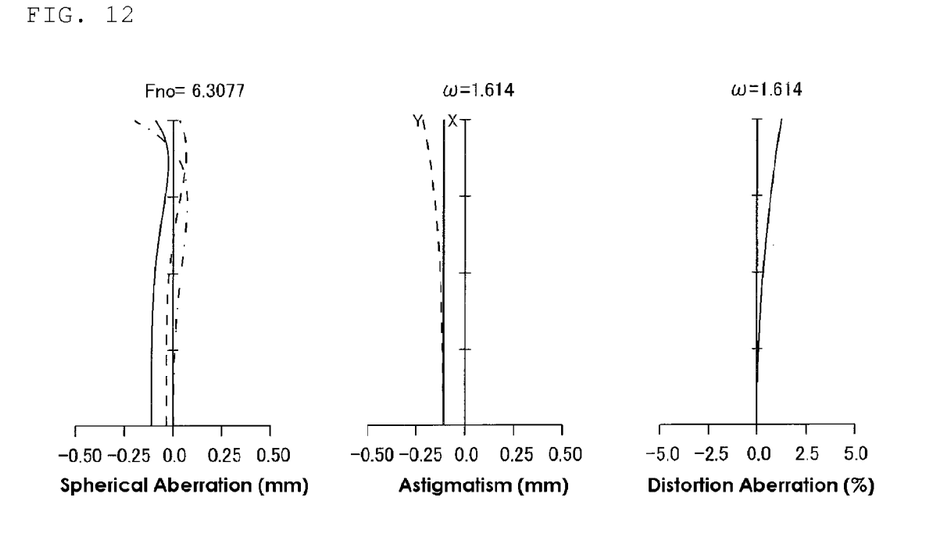
FIG. 12 includes a spherical aberration graph, an astigmatism graph, and a distortion aberration graph, in a state in which the zoom lens in Example 3 at a telephoto end is focused on infinity.

FIG. 10 shows spherical aberration, astigmatism, and distortion aberration, in focusing at infinity of the zoom lens in Example 3 of numeric values above in a wide angle end. FIG. 11 shows spherical aberration, astigmatism, and distortion aberration, in focusing at infinity of the zoom lens in an intermediate focal length. FIG. 12 shows spherical aberration, astigmatism, and distortion aberration, in focusing at infinity of the zoom lens at a telephoto end.

Table 12 shows values of each of the conditional expressions (1) to (5) above if specific numeric values are applied to the zoom lenses in Examples 1 to 3.

TABLE 12

|  | Example 1 | Example 2 | Example 3 |
|---|---|---|---|
| Conditional Expression (1) | −0.971 | −0.975 | −1.086 |
| Conditional Expression (2) | −4.905 | −6.807 | −8.828 |
| Conditional Expression (3) | 2.502 | 2.857 | 3.380 |
| Conditional Expression (4) | 1.348 | 1.370 | 1.180 |
| Conditional Expression (5) | 1.788 | 1.828 | 0.869 |

INDUSTRIAL APPLICABILITY

According to the present invention, a small-sized zoom lens capable of having high imaging performance and achieving a high magnification change ratio as well as high speed autofocus can be provided by applying a telephoto system of so-called a telephoto type employing a rear focus method to minimize a movement of each of lens groups in zooming and focusing, and an imaging apparatus including the zoom lens above is provided. In other words, a zoom lens suitable for a small-sized imaging system based on the Micro Four Thirds standard can be provided.

SYMBOL LIST

G1 . . . first lens group
G2 . . . second lens group
G3 . . . positive lens group C
G4 . . . negative lens group A
G5 . . . negative lens group B
STOP . . . diaphragm

The invention claimed is:

1. A zoom lens composed of:
an object side lens group having positive refractive power; and
an image focusing side lens group having negative refractive power arranged in order from an object side, wherein,
the object side lens group comprises, in order from the object side:
a first lens group having positive refractive power; and
a second lens group having negative refractive power,
the image focusing side lens group consists of, in order from the object side:
a negative lens group A having negative refractive power; and
a negative lens group B having negative refractive power arranged by facing the negative lens group A across an air distance, wherein focusing from infinity to a close object is achieved by moving just the negative lens group A toward an image focusing side and satisfy conditional expressions below:

$$-1.80 < \beta 2t < -0.94 \quad (1)$$

$$(1-\beta At^2) \times \beta Bt^2 < -4.5 \quad (2)$$

where
"β2t": lateral magnification at a telephoto end of the second lens group in infinity focusing,
"βAt": lateral magnification at a telephoto end of the negative lens group A in infinity focusing,
"βBt": lateral magnification at a telephoto end of the negative lens group B in infinity focusing.

2. The zoom lens according to claim 1, wherein the image focusing side lens group satisfies a conditional expression below:

$$2.1 < \beta rt < 3.5 \quad (3)$$

where
"βrt": composite lateral magnification at a telephoto end of the image focusing side lens group in infinity focusing.

3. The zoom lens according to claim 1, wherein the negative lens group A satisfies a conditional expression below:

$$1.05 < \beta At/\beta Aw < 1.45 \quad (4)$$

where
"βAt": lateral magnification at a telephoto end of the negative lens group A in infinity focusing,
"βAw": lateral magnification at a wide angle end of the negative lens group A in infinity focusing.

4. The zoom lens according to claim 1, wherein the object side lens group is provided a positive lens group C having positive refractive power disposed at most image focusing side in the object side lens group; and wherein
the positive lens group C faces the negative lens group A across an air distance.

5. The zoom lens according to claim 4, wherein the positive lens group C in the object side lens group and the negative lens group B of the image focusing side lens group move along the same trace in magnification change from the wide angle end to the telephoto end.

6. The zoom lens according to claim 1, wherein the first lens group satisfies a conditional expression below:

$$0.5 < f1/\sqrt{(fw \times ft)} < 2.5 \quad (5)$$

where
"f1": a focal length of the first lens group,
"fw": a focal length of the zoom lens at the wide angle end,
"ft": a focal length of the zoom lens at the telephoto end.

7. An imaging apparatus including:
the zoom lens according to claim 1; and
an imaging sensor which converts an optical image formed by the zoom lens into an electric signal provided on the image focusing side of the zoom lenses.

* * * * *